US012181143B2

(12) United States Patent
Chen et al.

(10) Patent No.: US 12,181,143 B2
(45) Date of Patent: Dec. 31, 2024

(54) FAN LAMP

(71) Applicants: SUZHOU OPPLE LIGHTING CO., LTD., Suzhou (CN); OPPLE LIGHTING CO., LTD., Shanghai (CN)

(72) Inventors: Zhanhua Chen, Suzhou (CN); Dingde Zhou, Suzhou (CN); Liping Dai, Suzhou (CN); Guobao Zhang, Suzhou (CN)

(73) Assignees: Suzhou Opple Lighting Co., Ltd., Suzhou (CN); Opple Lighting Co., Ltd., Shanghai (CN)

( * ) Notice: Subject to any disclaimer, the term of this patent is extended or adjusted under 35 U.S.C. 154(b) by 0 days.

(21) Appl. No.: 18/140,613

(22) Filed: Apr. 27, 2023

(65) Prior Publication Data

US 2023/0266000 A1 Aug. 24, 2023

Related U.S. Application Data

(63) Continuation of application No. PCT/CN2021/118994, filed on Sep. 17, 2021.

(30) Foreign Application Priority Data

Sep. 21, 2020 (CN) ......................... 202010998583.7
Sep. 21, 2020 (CN) ......................... 202022080670.2

(51) Int. Cl.
*F21V 33/00* (2006.01)
*F04D 25/08* (2006.01)
(Continued)

(52) U.S. Cl.
CPC ........ *F21V 33/0096* (2013.01); *F04D 25/088* (2013.01); *F04D 29/38* (2013.01); *F21Y 2115/10* (2016.08)

(58) Field of Classification Search
CPC ......................... F21V 33/0096; F21Y 2115/10
See application file for complete search history.

(56) References Cited

U.S. PATENT DOCUMENTS 9,506,644 B2 * 11/2016 Liu ..................... F21V 33/0096
2016/0169503 A1 * 6/2016 Chen ..................... F04D 25/088
362/382
(Continued)

FOREIGN PATENT DOCUMENTS

CN 204371717 U 6/2015
CN 109114038 A * 1/2019 ........... F04D 25/088
(Continued)

OTHER PUBLICATIONS

International Search Report of PCT Application No. PCT/CN2021/118994 dated Oct. 28, 2021with English translation, (4p).

*Primary Examiner* — Thomas M Sember
(74) *Attorney, Agent, or Firm* — Arch & Lake LLP

(57) ABSTRACT

The disclosure discloses a fan lamp, including a lamp panel, a lamp assembly, a fan assembly, and a motor assembly. The lamp assembly is provided on a side of the lamp panel; the fan assembly is provided on a side of the lamp panel away from the lamp assembly; and the motor assembly includes a direct current motor, and the fan assembly is configured to rotate under the driving of the direct current motor.

23 Claims, 12 Drawing Sheets

(51) Int. Cl.

| | |
|---|---|
| ***F04D 29/38*** | (2006.01) |
| ***F21Y 115/10*** | (2016.01) |

(56) References Cited

U.S. PATENT DOCUMENTS

| | | | | |
|---|---|---|---|---|
| 2019/0323524 | A1* | 10/2019 | Jackson | B01D 46/44 |
| 2020/0378393 | A1* | 12/2020 | Zhou | F04D 29/366 |
| 2021/0115938 | A1* | 4/2021 | Chen | F21S 8/063 |

FOREIGN PATENT DOCUMENTS

| | | | |
|---|---|---|---|
| CN | 109989939 | A | 7/2019 |
| CN | 11623285 | A | 9/2020 |
| CN | 111997925 | A | 11/2020 |
| CN | 111997926 | A | 11/2020 |
| JP | 2013189953 | A | 9/2013 |

* cited by examiner

FAN LAMP

CROSS-REFERENCE TO RELATED APPLICATIONS

This application is based upon and claims the priority of PCT patent application No. PCT/CN2021/118994 filed on Sep. 17, 2021 which claims priority to the Chinese patent application No. 202010998583.7 filed on Sep. 21, 2020 and the Chinese patent application No. 202022080670.2 filed on Sep. 21, 2020, the entire contents of which are hereby incorporated by reference herein for all purposes.

TECHNICAL FIELD

This application relates to a technical field of lighting device, in particular to a fan lamp.

BACKGROUND

The fan lamp is a common household appliance, and is a combination apparatus of a fan and a lamp, so that the fan lamp has the function of the lamp and the function of the fan.

SUMMARY OF THE UTILITY MODEL

The present disclosure disclose a fan lamp.

According to the disclosure, a fan lamp provided. The fan lamp may include a lamp panel, a lamp assembly, a fan assembly, and a motor assembly. The lamp assembly is provided on a side of the lamp panel; the fan assembly is provided on a side of the lamp panel away from the lamp assembly; and the motor assembly comprises a direct current motor, and the fan assembly is configured to rotate under the driving of the direct current motor.

It is to be understood that the foregoing general description and the following detailed description are exemplary and explanatory only and are not restrictive of the disclosure.

BRIEF DESCRIPTION OF THE DRAWINGS

The drawings described herein are used to provide further understanding of the present disclosure and constitute a part of the present disclosure. The examples and descriptions of the present disclosure are used to explain the present disclosure and do not constitute an improper limitation of the present disclosure. In the drawings.

DETAILED DESCRIPTION

Figure 1:
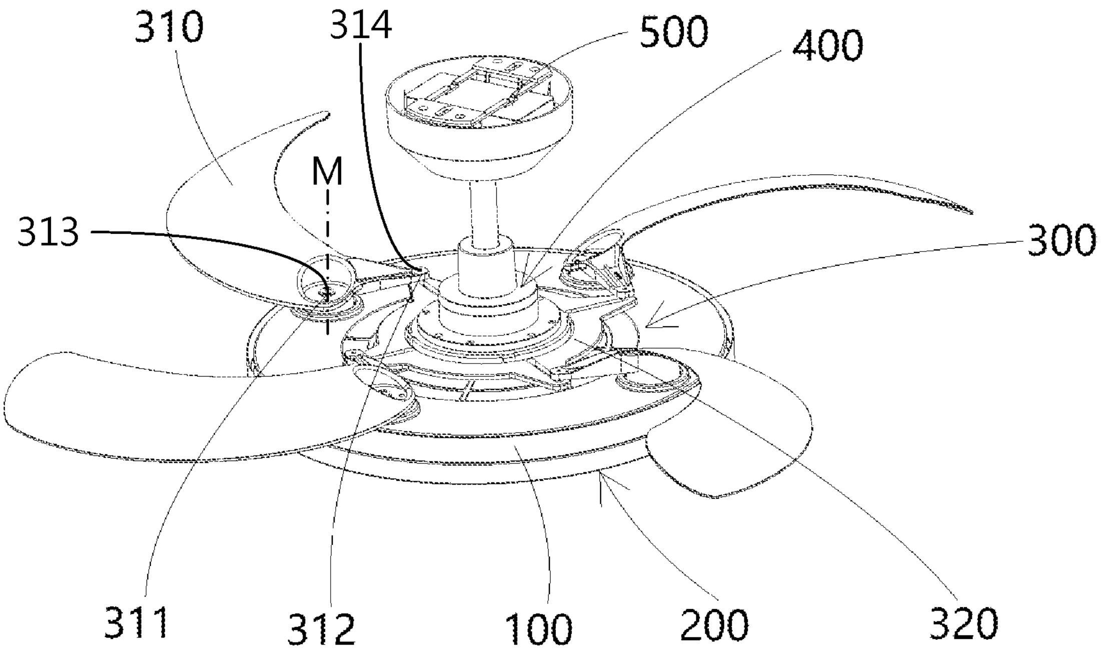
FIG. 1 is a schematic diagram of a fan lamp disclosed by an example of the present disclosure.
Figure 2:
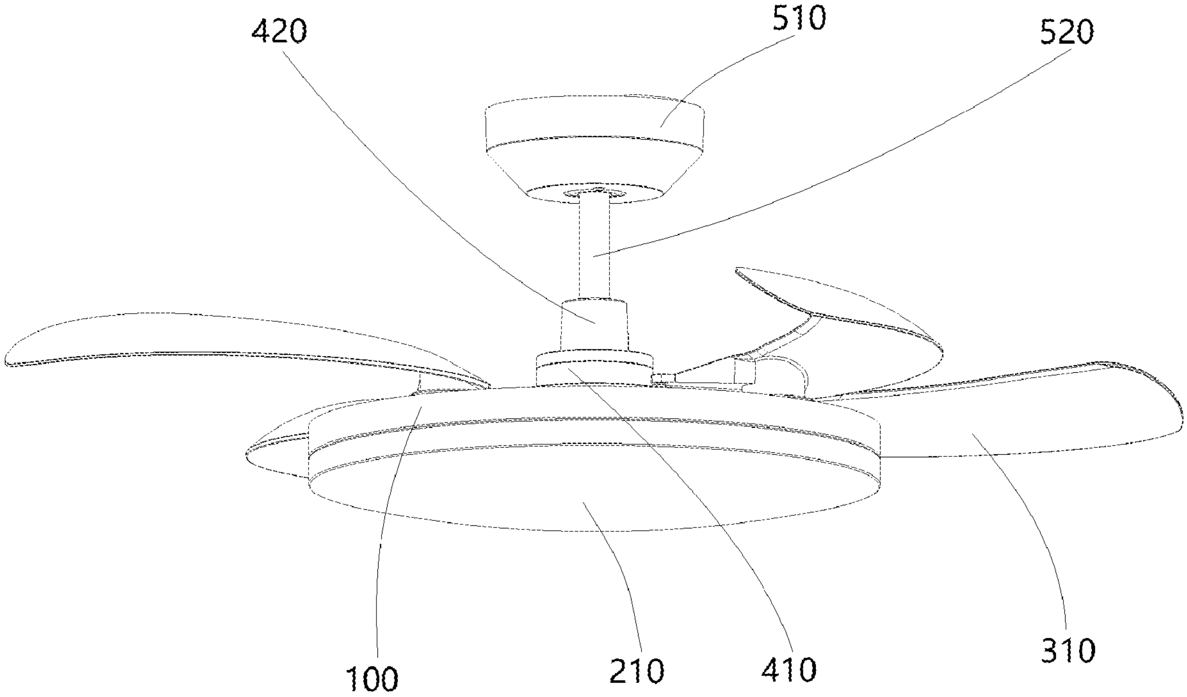
FIG. 2 is a schematic diagram of another angle of the fan lamp shown in FIG. 1.
Figure 3:
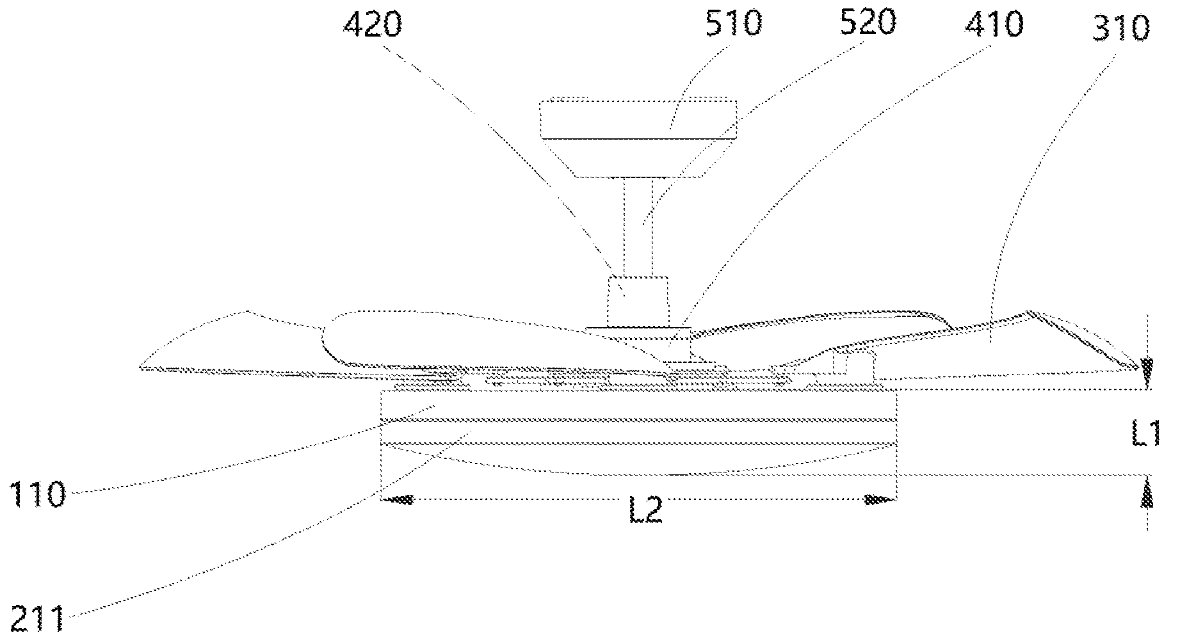
FIG. 3 is a front view of the fan lamp shown in FIG. 1.
Figure 4:
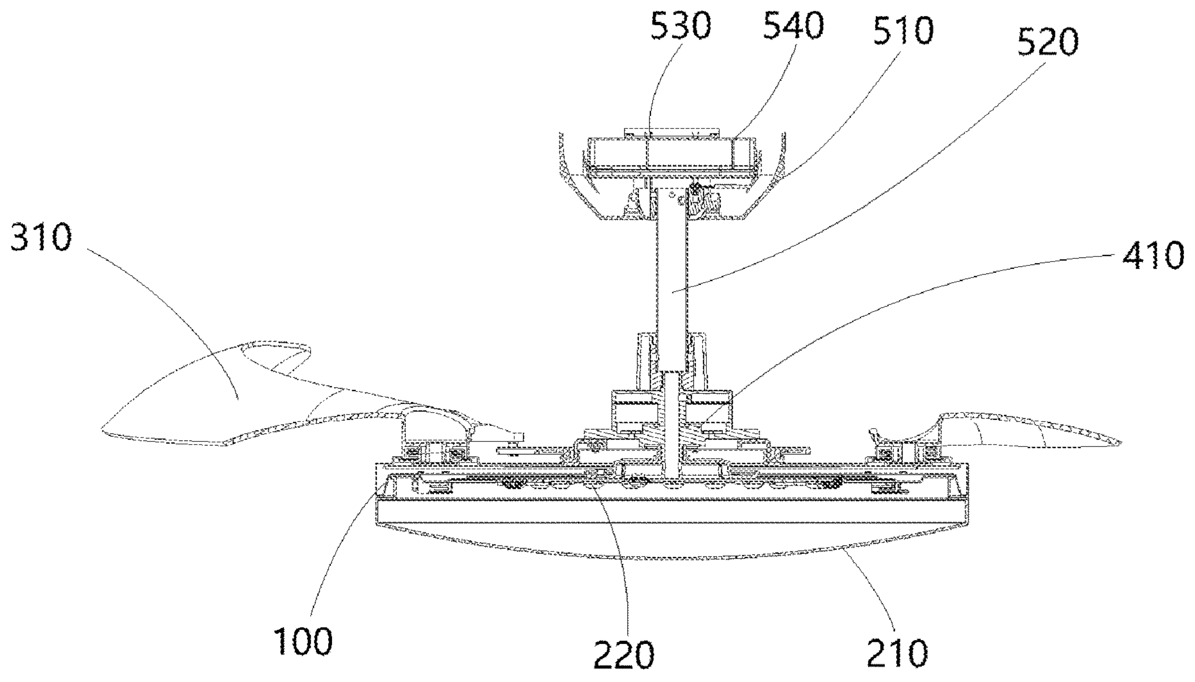
FIG. 4 is a cross-sectional view of the fan lamp shown in FIG. 3.
Figure 5:
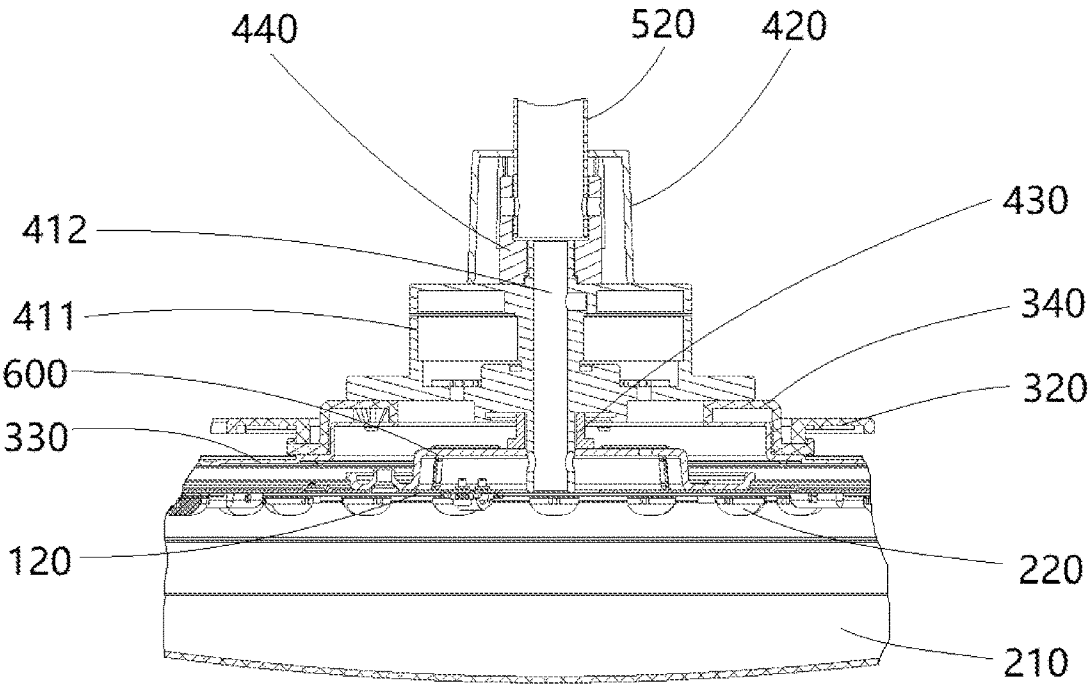
FIG. 5 is a partially enlarged schematic diagram of the position of the motor assembly of the cross-sectional view of the fan lamp shown in FIG. 4.
Figure 6:
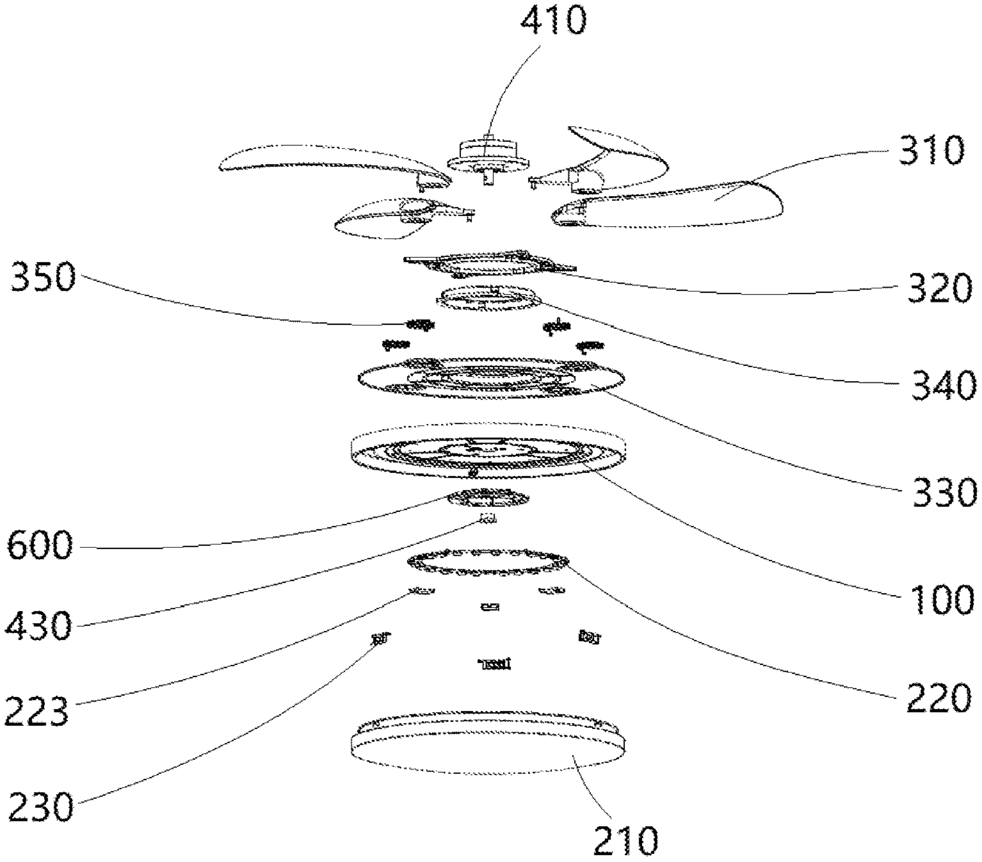
FIG. 6 is an exploded view of part of the assemblies of the fan lamp shown in FIG. 1.
Figure 7:
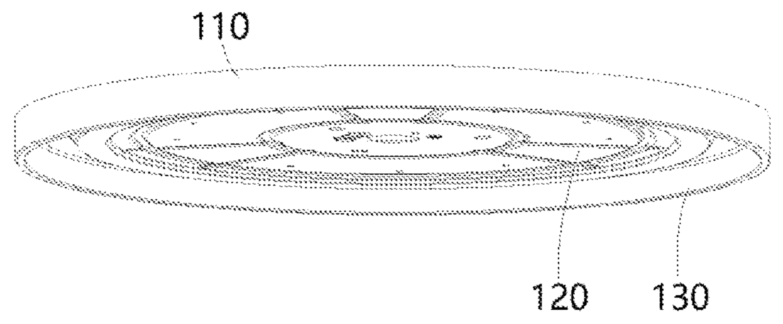
FIG. 7 is a schematic diagram of a lamp panel of the fan lamp shown in FIG. 1.
Figure 8:
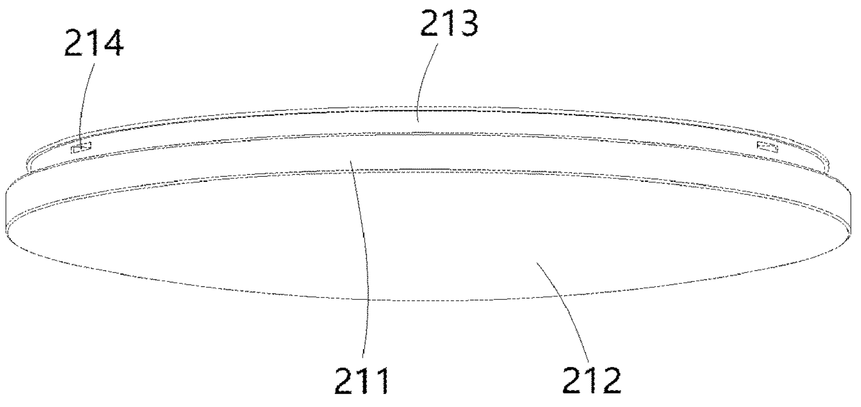
FIG. 8 is a schematic diagram of a lamp shade of the fan lamp shown in FIG. 1.

In order to make the objectives, technical solutions and advantages of the present disclosure clearer, technical solutions of the examples will be described in a clearly and fully understandable way in connection with the drawings related to the examples of the disclosure. It is apparent that the described examples are a part but not all of the examples of the disclosure. Based on the described examples herein, one of ordinary skill in the art can obtain other example(s), without any creative work, which shall be within the scope of the disclosure.

Reference numerals used in this disclosure may include: 100—lamp panel, 110—lamp panel circumferential outer wall, 120—bottom plate, 121—mating section, 130—circumferential plate, 200—lamp assembly, 210—lamp shade, 211—lamp shade circumferential outer wall, 212—lamp shade body, 213—annular mounting portion, 214—clamping protrusion, 2141—first guiding inclination surface, 220—light source assembly, 221—substrate, 221*a*—first joint portion, 221*b*—second joint portion, 222—LED light source, 223—conjunction member, 230—clamping member, 231—top wall, 232—bottom wall, 233—side wall, 234—stopper, 2341—second guiding inclination surface, 235—clamping groove, 236—screw thread mounting portion, 237—clamping portion, 238—first gap, 239—second gap, 240—first mounting portion, 250—second mounting portion, 260—guiding structure, 300—fan assembly, 310—fan blade, 311—mounting portion, 312—connecting portion, 313—first rotating connecting portion, 314—second rotating connecting portion, 315—inner edge line, 316—outer edge line, 317—counterweight structure, 318—fan body, 320—synchronizer, 330—turntable, 340—fixing ring, 350—reset spring, 400—motor assembly, 410—direct current motor, 411—motor main body, 412—motor shaft, 420—first decorative cover, 430—shaft sleeve, 440—connecting member, 500—top mounting assembly, 510—second decorative cover, 520—derrick, 530—hanging cup, 540—driver, 600—fixing plate, 700—threaded mounting member, L1—first distance, L2—second distance, M—central axis.

The fan lamp is usually stacked a lamp based on a typical fan, an overall size of the fan lamp is large, the required installing space is large, and it is not benefit in the transportation of the fan lamp. In addition, because an optical cavity of the traditional lamp is large, the overall appearance of the fan lamp is relatively bulky, and the use experience of the user is affected.

The technical solutions disclosed in various examples of this disclosure are described in detail below with reference to the drawings.

As shown in FIG. 1 to FIG. 13, examples of the present disclosure disclose a fan lamp, and the fan lamp includes a lamp panel 100, a lamp assembly 200, a fan assembly 300, a motor assembly 400, and a top mounting assembly 500.

The lamp assembly 200 is provided on a side of the lamp panel 100, the fan assembly 300 is provided on a side of the lamp panel 100 away from the lamp assembly 200, the motor assembly 400 includes a direct current motor 410, and the fan assembly 300 is configured to rotate under the driving of the direct current motor 410. The fan assembly 300 can achieve the blowing function, and the lamp assembly 200 can illuminate, so that the functionality of the fan lamp is more robust.

The fan lamp uses the direct current motor 410 to drive the fan assembly 300 to rotate, without using additional members, such as a capacitor or a motor cover, the structure of the motor assembly 400 is simplified, and the volume of the motor assembly 400 is reduced, so that an overall volume of the fan lamp is reduced, which makes the structure of the fan lamp cleaner and more attractive, and the use experience of the user is improved.

In an optional example, the fan assembly 300 may include a turntable 330, a plurality of fan blades 310, and a synchronizer 320. Each of the plurality of fan blades 310 has a mounting end and a free end, and the mounting end has a mounting portion 311 and a connecting portion 312 spaced apart from each other. The mounting portion 311 is mounted on the turntable 330 through a first rotating connecting portion 313. Each of the plurality of fan blades 310 can rotate around a central axis M of the first rotating connecting portion 313, and the connecting portion 312 is mounted on the synchronizer 320 through a second rotating connecting portion 314, so that the plurality of fan blades 310 are capable of synchronously switching between storage positions and unfolding positions. Optionally, the number of the fan blades 310 may be four, and the four fan blades 310 may be uniformly arranged, of course, the number of the fan blades 310 may also be other values, which is not limited in this example of this disclosure. When the fan blades 310 are in the storage positions, the fan blades 310 retracts relative to the turntable 330, and both the turntable 330 and the fan blades 310 do not rotate. In a case where the fan blades 310 are in the unfolding positions, the fan blades 310 extends out relative to the turntable 330, and along with the rotation of the turntable 330, the fan blades 310 also rotate, thereby realizing blowing. Optionally, the synchronizer 320 is provided with a plurality of sliding grooves, the second rotating connecting portion 314 is provided with a protruding portion, and the protruding portion of each second rotating connecting portion 314 is in sliding fit with each sliding groove in a one-to-one correspondence. When the turntable 330 rotates, the synchronizer 320 rotates with the turntable 330, and under the action of the plurality of sliding grooves and a plurality of protrusion portions, various fan blades 310 can be unfolded synchronously and finally reach the unfolding positions. The synchronizer 320 herein can more reliably realize the synchronous rotation of various fan blades 310, so as to overcome the effect of factors, such as processing errors and assembly errors, so that the heat dissipation effect of the fan assembly 300 can approach the design value more reliably, thereby improving the blowing effect of the fan assembly 300. Meanwhile, the structure can also promote the acting force of the fan lamp to be more uniformly distributed, so as to prevent the fan lamp from shaking due to uneven force distribution.

In an example, a direction that is parallel to the central axis M is defined as a first direction, and when the fan blades 310 are in the storage positions, the orthographic projections of the fan blades 310 in the first direction are in the orthographic projection of the lamp panel 100 in the first direction. That is, in this state, edges of the fan blades 310 do not exceed an edge of the lamp panel 100, so that the space occupied by the fan blades 310 in this state is as small as possible, thereby optimizing the structural compactness of the fan lamp.

In order to better achieve the reset of fan blades 310, the fan assembly 300 may further include reset springs 350, one end of each of reset springs 350 is connected to the turntable 330, and the other end of each of reset springs 350 is connected to one of fan blades 310. When the fan blades 310 are unfolded, because each of the reset springs 350 receives a force from the fan blades 310, the each of reset springs 350 is deformed. When the fan assembly 300 finishes working, the centrifugal force received by the fan assembly 300 is disappeared, the acting force acting on the reset springs 350 by the fan blades 310 is disappeared accordingly, and the reset springs 350 can recover the deformation, thereby applying a reaction force to the fan blades 310, so that the fan blades 310 retract relative to the turntable 330 until the fan blades 310 are retracted in place. The reset springs 350 may be torsion springs, each of torsion springs may be mounted on the mounting portion 311, and the space occupied by the torsion springs is small, thereby more facilitating achievement of a compact design of the fan lamp.

Optionally, the direct current motor 410 includes a motor main body 411 and a motor shaft 412, the motor main body 411 is fixedly mounted on the turntable 330, and the motor shaft 412 is fixed relative to the lamp panel 100. When the direct current motor 410 is energized, the motor shaft 412 is fixed, and the motor main body 411 rotates relative to the motor shaft 412, thereby driving the turntable 330 to rotate, thereby realizing unfolding of the fan blades 310. In this scheme, the motor main body 411 drives the turntable 330 to rotate, the motor main body 411 is more stable when rotating, and the ability of the motor main body 411 to bear an action force is stronger, so that the transmission efficiency of the direct current motor 410 is higher, and the service life of the direct current motor 410 is longer.

In an example, the fan lamp includes a top mounting assembly 500, and the top mounting assembly 500 is configured to achieve a connection between the fan lamp and a mounting foundation (such as a roof), thereby achieving the mounting of the fan lamp. The motor assembly 400 is provided on a side of the turntable 330 away from the lamp panel 100, the top mounting assembly 500 is provided on a side of the motor assembly 400 away from the turntable 330, the top mounting assembly 500 includes a hanging cup 530 and a derrick 520, an end of the derrick 520 is connected to the hanging cup 530, and the other end of the derrick 520 is fixed to the motor shaft 412. The length of the derrick 520 may be flexibly configured, and optionally, the derrick 520 may adopt a multi-section structure, so that a user can adjust the length of the derrick 520 according to oneself needs, thereby changing the installation height of the fan lamp. In a case where the derrick 520 is directly fixedly connected to the motor shaft 412, the entire fan lamp is simpler in structure and more compact in structure.

In a case where the fan lamp includes a top mounting assembly 500, and the top mounting assembly 500 includes a derrick 520, the motor assembly 400 may include a connecting member 440 and a first decorative cover 420, the connecting member 440 is connected to the derrick 520 and the motor shaft 412, and the first decorative cover 420 covers the outer side of the connecting member 440. Optionally, an end of the connecting member 440 may be in inserting connection with the derrick 520, an end of the motor shaft 412 extends into the connecting member 440, such a manner is more convenient to operate, and further, the connecting member 440 and the derrick 520 are made detachable, thereby facilitating maintenance of the fan lamp. The first decorative cover 420 can separate the connecting member 440 from the external environment, thereby improving the aesthetic degree of the fan lamp, and further, in a case where the user needs to disassemble the derrick 520 and the connecting member 440, the first decorative cover 420 must be removed first, thereby reducing the risk that the derrick 520 and the connecting member 440 are disassembled by a mistake. Optionally, in order to simplify the disassembly and assembly operation of the first decorative cover 420, the first decorative cover 420 may be sleeved outside the derrick 520 and can flexibly move relative to the derrick 520, and the first decorative cover 420 may cover the connecting member 440 and the like structures under the action of its own gravity.

Furthermore, the fan assembly 300 further includes a fixing ring 340, the fixing ring 340 is fixedly mounted on the turntable 330, the motor main body 411 is fixedly mounted on the fixing ring 340, the synchronizer 320 is annular, the synchronizer 320 is sleeved on the outer side of the fixing ring 340, and a limiting structure (not shown) is provided between the synchronizer 320 and the fixing ring 340. The limiting structure includes an unfolding limiting portion and a storage limiting portion, the unfolding limiting portion can limit the fan blades 310 to the unfolding positions, and the storage limiting portion can limit the fan blades 310 to the storage positions. The synchronizer 320 may rotate relative to the fixing ring 340, and in a case where the synchronizer 320 cooperates with the unfolding limiting portion, the synchronizer 320 cannot continue to rotate, so that the fan blades 310 are kept in the unfolding positions; similarly, in a case where the synchronizer 320 cooperates with the storage limiting portion, the synchronizer 320 cannot continue to rotate, so that the fan blades 310 are kept in the storage positions. By means of the unfolding limiting portion and the storage limiting portion, the fan blades 310 can be more reliably kept in the unfolding positions and the storage positions, and the situation that the fan blades 310 are mistakenly moved due to the action of other external forces is avoided.

The above-mentioned unfolding limiting portion and the storage limiting portion can both realize relative positioning between the synchronizer 320 and the fixing ring 340 by a clamping way, and certainly, other ways can also be adopted, which is not limited in the examples of the present disclosure.

Optionally, the fan lamp may further include a fixing plate 600, the fixing plate 600 is fixedly mounted on the motor shaft 412, the lamp panel 100 is fixedly mounted on the fixing plate 600, that is, the motor shaft 412 may be connected to the lamp panel 100 through the fixing plate 600, and the fixing plate 600 is located between the fan assembly 300 and the lamp panel 100. Because the fan assembly 300 can rotate when working, and the lamp panel 100 is fixed, the fan assembly 300 and the lamp panel 100 can be better separated by the fixing plate 600, and further the fan assembly 300 can be prevented from driving the lamp panel 100 to rotate, thereby achieving the purpose of improving the reliability of the fan lamp during working. Furthermore, the fixing plate 600 can abut against the lamp panel 100, thereby better limiting the shaking of the lamp panel 100, and preventing the lamp panel 100 from slightly swinging due to the movement of the fixing plate 600, thereby improving the user experience when the fan lamp is used.

Optionally, the fan lamp further includes a shaft sleeve 430 sleeved on the motor shaft 412, and the shaft sleeve 430 is located between the motor main body 411 and the fixing plate 600. The shaft sleeve 430 herein can better separate the motor main body 411 from the fixing plate 600, thereby further improving the stability of the fan lamp during operation.

The direct current motor 410 may be in a hidden state as a whole relative to the fan assembly 300, and specifically, a motor cover may be provided to cover the direct current motor 410, but this structure may cause a large number of members of the fan lamp, resulting in a high cost of the fan lamp, and the weight of the fan lamp may also be increased accordingly. Based on this, the direct current motor 410 may be configured to be at least partially exposed relative to the fan assembly 300. The security of the direct current motor 410 is high, and therefore, even if the direct current motor 410 is at least partially exposed relative to the fan assembly 300, there is no potential safety risk, meanwhile, this example omit the structure, such as the motor cover, that covers the outside of the direct current motor 410, thereby reducing the members contained in the fan lamp, thereby reducing the cost and weight of the fan lamp, and at the same time, the height of the fan lamp can be appropriately reduced, so that the whole fan lamp is lighter.

In an optional example, the lamp assembly 200 includes a lamp shade 210 and a light source assembly 220, the lamp shade 210 is fixedly mounted on the lamp panel 100, the light source assembly 220 is in an accommodation cavity surrounded by the lamp panel 100 and the lamp shade 210. A contour of the lamp shade circumferential outer wall 211 of the lampshade 210 is the same as the contour of the lamp panel circumferential outer wall 110 of the lamp panel 100. An end of the lamp shade circumferential outer wall 211 near the fan assembly 300 abuts against an end of the lamp panel circumferential outer wall 110 away from the fan assembly 300. With this structure, when observing in a height direction (that is, the direction parallel to the central axis M) of the fan lamp, the edge of the lamp panel 100 does not exceed the edge of the lamp shade 210, while the edge of the lamp shade 210 does not exceed the edge of the lamp panel 100, so that the structure of the whole fan lamp is more compact and concise, and the attractiveness of the fan lamp is higher.

Furthermore, the lamp panel 100 may include a bottom plate 120 and a circumferential plate 130, the lamp shade 210 includes a lamp shade body 212 and an annular mounting portion 213, the lamp shade circumferential outer wall 211 is located at the periphery of the lamp shade body 212, and the lamp panel circumferential outer wall 110 is located at the periphery of the circumferential plate 130, the annular mounting portion 213 is sleeved in the inner side of the circumferential plate 130, and the annular mounting portion 213 is clamp with the lamp panel 100. On one hand, in a case where the annular mounting portion 213 is sleeved in the inner side of the circumferential plate 130, the annular mounting portion 213 and the circumferential plate 130 may generate a limiting effect in the radial direction (i.e., the direction perpendicular to the central axis M) of the annular mounting portion 213, so that the lamp panel 100 and the lamp shade 210 have higher strength after being connected. In addition, the annular mounting portion 213 and the lamp panel 100 are connected in a clamping manner, so that the disassembly and assembly operation of the fan lamp can be simplified, and the fan lamp can be maintained conveniently.

The clamping structure of the annular mounting portion 213 and the lamp panel 100 has a plurality of options, for example, a protrusion may be provided on one of the annular mounting portion 213 and the lamp panel 100, and the other one of the annular mounting portion 213 and the lamp panel 100 is provided with a groove, thereby achieving clamping by the cooperation of the protrusion and the groove. In other examples, the lamp assembly 200 may further include a clamping member 230, the bottom plate 120 is clamped with the annular mounting portion 213 through the clamping member 230, and the clamping member 230 is integrally made. The clamping member 230 itself has a relatively high structural strength, and meanwhile, if the clamping connection between the lamp panel 100 and the lamp shade 210 fails, the lamp panel 100 and the lamp shade 210 can be re-clamped together by replacing the clamping member 230, so that the clamping member 230 herein can also simplify the maintenance operation of the fan lamp.

Optionally, the clamping member 230 may include a first mounting portion 240 and a second mounting portion 250, the first mounting portion 240 has a threaded mounting portion 236 and a clamping portion 237, the bottom plate 120 is provided with a mating section 121 cooperating with the clamping portion 237, the threaded mounting portion 236 is fastened on the bottom plate 120 through a threaded mounting member 700, and the clamping portion 237 is clamped with the mating section 121. In the second mounting portion 250 and the annular mounting portion 213, one of the second mounting portion 250 and the annular mounting portion 213 is provided with a clamping groove 235, the other one is provided with a clamping protrusion 214, and the clamping protrusion 214 is capable of clamping in the clamping groove 235. When the lamp panel 100 and the lamp shade 210 are assembled, the clamping portion 237 of the clamping member 230 is clamped with the mating section 121 of the bottom plate 120, and then the threaded mounting portion 236 of the clamping member 230 is fastened to the bottom plate 120 through the threaded mounting member 700, thereby completing the connection between the clamping member 230 and the lamp panel 100. Then, the connection between the clamping member 230 and the lamp shade 210 can be realized through the cooperation between the clamping protrusion 214 and the clamping groove 235, thereby completing the assembly of the lamp panel 100 and the lamp shade 210. In this example, the threaded mounting portion 236 can improve the connection strength between the clamping member 230 and the lamp panel 100, and the clamping operation can be simplified by achieving the clamping through the cooperation of the clamping protrusion 214 and the clamping groove 235, and at the same time, the clamping strength can be improved.

The number of the clamping members 230 may be one or more. In order to further improve the connection stability of the lamp shade 210 and the lamp panel 100, a plurality of clamping protrusions 214 are arranged on the annular mounting portion 213 at intervals along the circumferential direction of the annular mounting portion 213, and the lamp assembly 200 includes a plurality of clamping members 230 corresponding to the clamping protrusions 214.

In order to facilitate the clamping between the clamping protrusions 214 and the clamping members 230, at least one of the plurality of clamping protrusions 214 and the the plurality of clamping members 230 are made of an elastically deformable material. During the assembly operation, when an action force is generated between the clamping protrusions 214 and the clamping members 230, at least one of the clamping protrusions 214 and the clamping members 230 may be elastically deformed, so that the clamping protrusions 214 and the clamping members 230 can be more smoothly clamped with each other, and the member that is elastically deformed can recover deformation after the clamping protrusion 214 and the clamping member 230 are matched in place, thereby ensuring the clamping strength. Further, a guiding structure 260 may also be provided on at least one of the clamping protrusions 214 and the clamping members 230, and the guiding structure 260 may guide the clamping process of the clamping protrusions 214 and the clamping members 230, so that the clamping protrusions 214 and the clamping members 230 can be clamped with each other more smoothly.

In an optional example, the guiding structure 260 includes a first guiding inclination surface 2141 provided on the clamping protrusion 214 and a second guiding inclination surface 2341 provided on the clamping member 230. Along the circumferential direction of the annular mounting portion 213, the first guiding inclination surface 2141 is located on an end surface of the clamping protrusions 214, and the second guiding inclination surface 2341 is located on a side of the clamping member 230 near the first guiding inclination surface 2141. Optionally, both the first guide inclination surface 2141 and the second guide inclination surface 2341 may be inclined planes or smooth curved surfaces. In the process that the clamping protrusion 214 and the clamping member 230 are clamped with each other, the first guiding inclination surface 2141 is in sliding fit with the second guiding inclination surface 2341, thereby achieving a guiding function, and the guiding structure 260 has the advantages of a simple structure and a better guiding effect.

Figure 9:
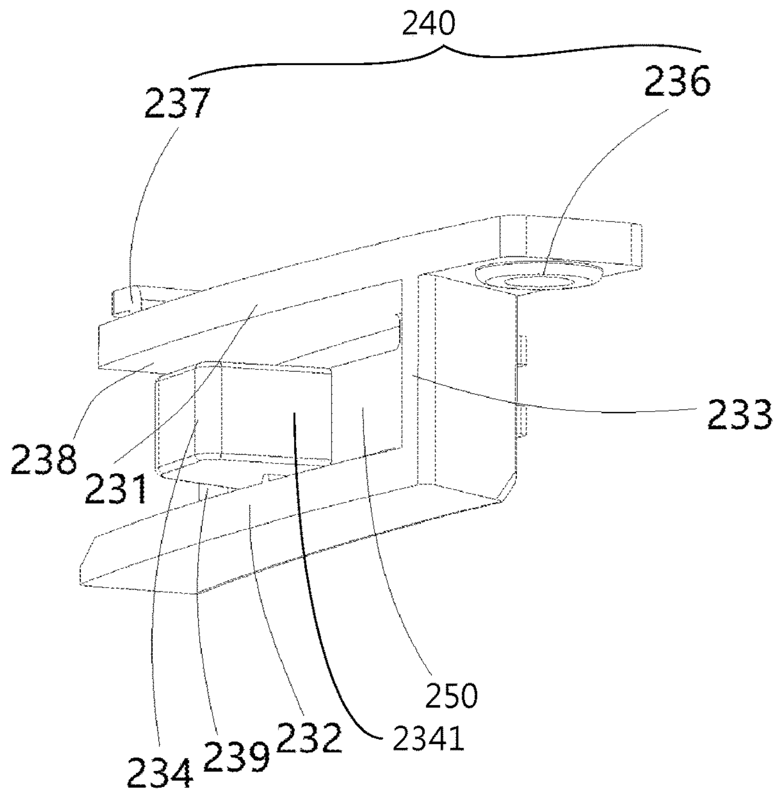
FIG. 9 is a schematic diagram of a clamping member of the fan lamp shown in FIG. 1.
Figure 10:
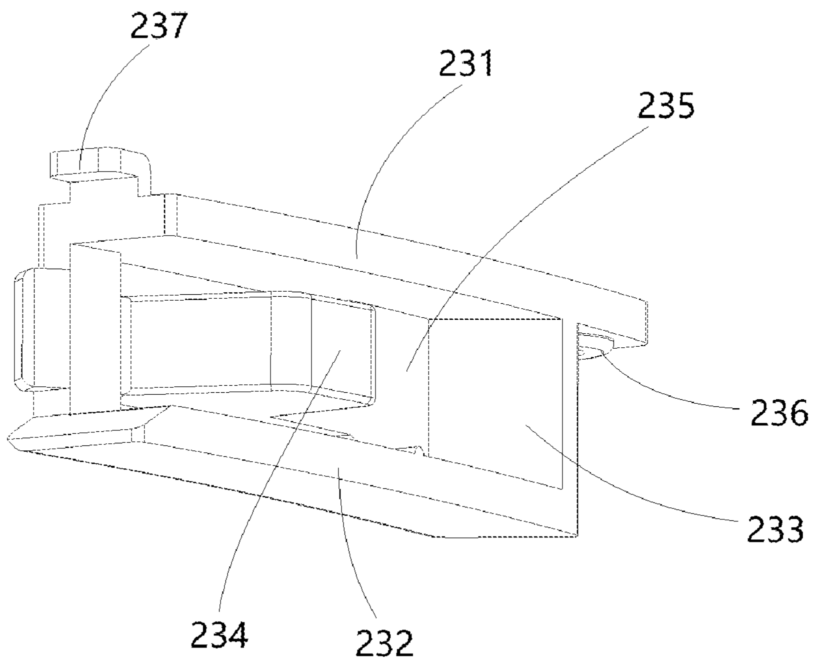
FIG. 10 is a schematic diagram of another angle of the clamping member shown in FIG. 9.
Figure 11:
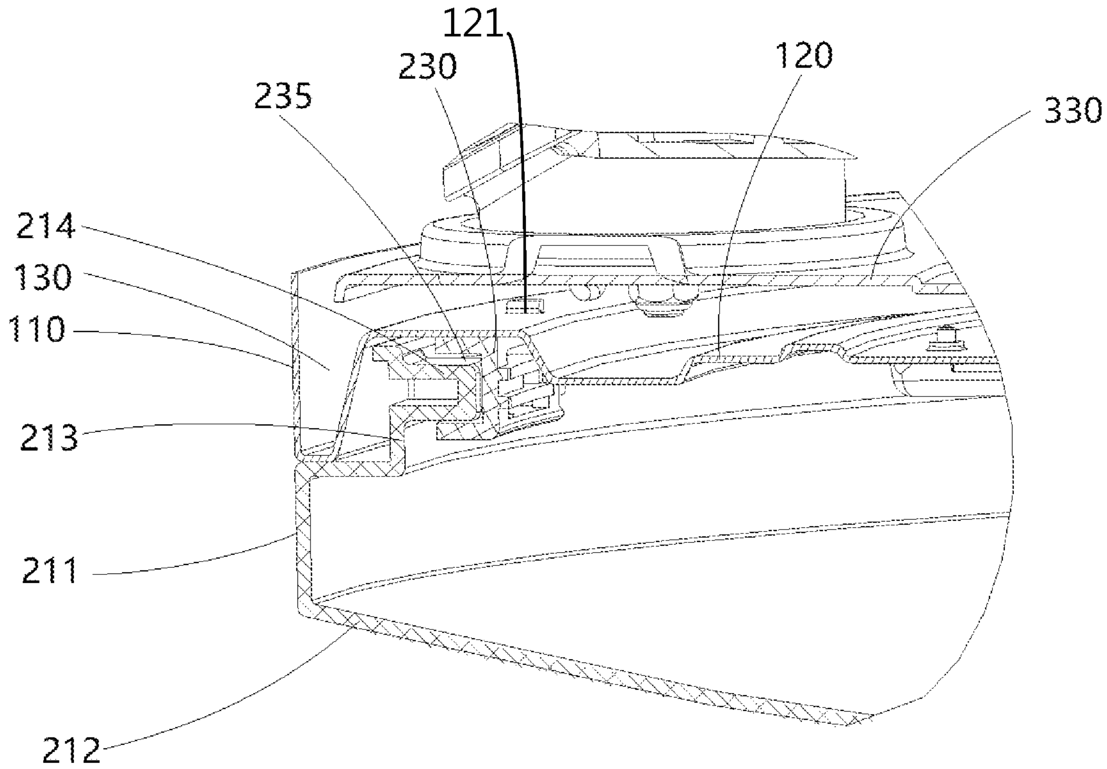
FIG. 11 is a partially cross-sectional view of a connection position of a lamp shade and a lamp panel of the fan lamp shown in FIG. 1.
Figure 12:
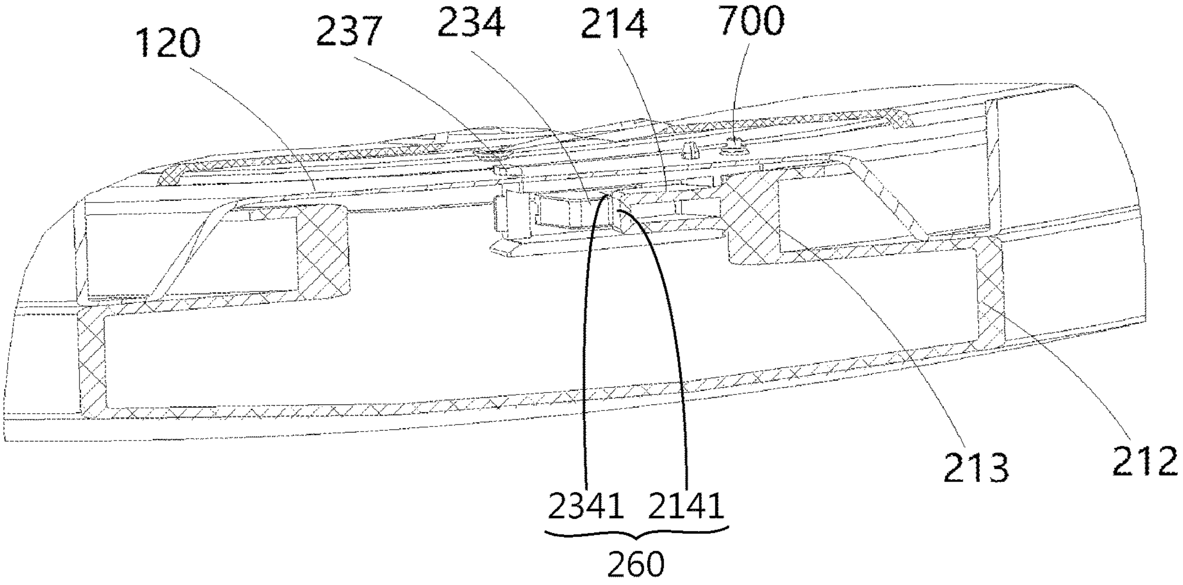
FIG. 12 is a partially cross-sectional view of another angle of the connection position of the lamp shade and the lamp panel of the fan lamp shown in FIG. 1.
Figure 13:
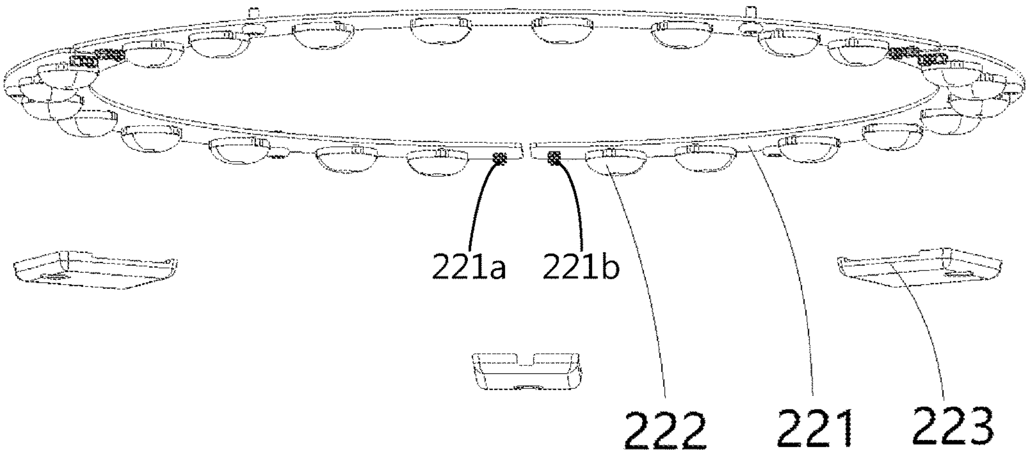
FIG. 13 is a schematic diagram of a light source assembly of the fan lamp shown in FIG. 1.
Figure 14:
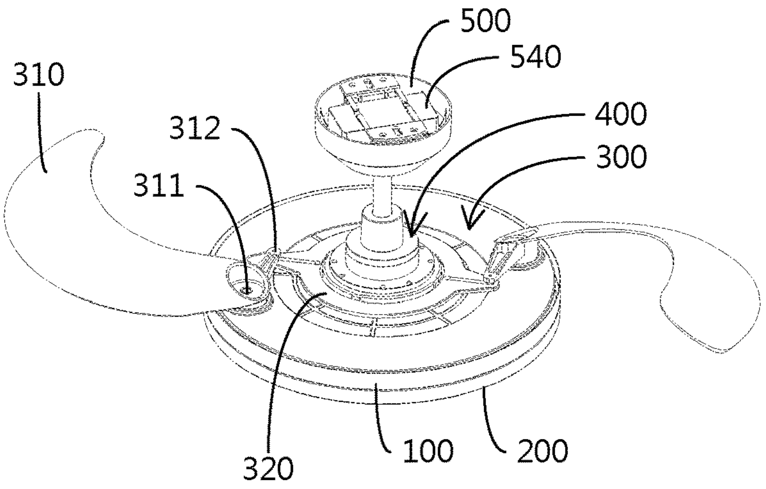
FIG. 14 to FIG. 18 are schematic diagrams of a fan lamp disclosed by another example of the present disclosure under different viewing angles.
Figure 15:
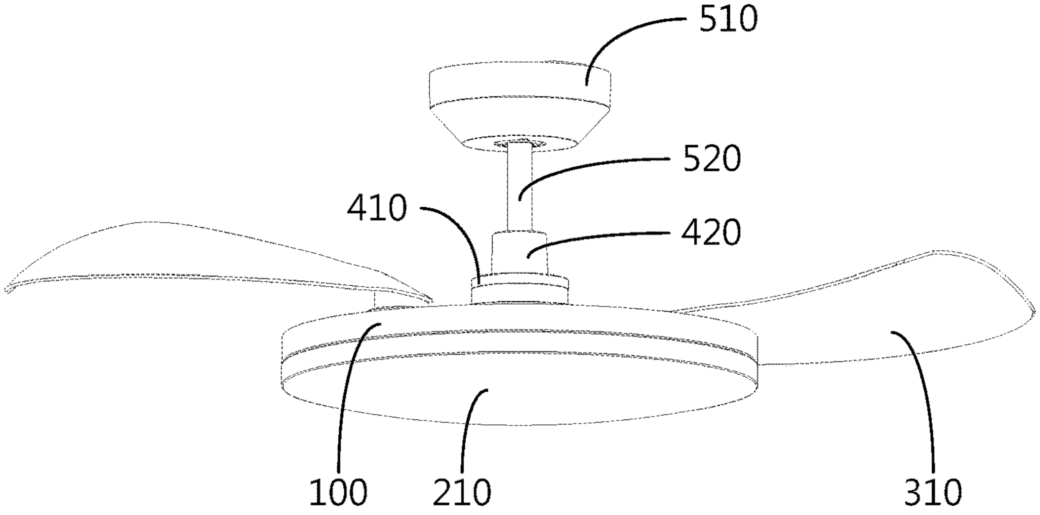
Figure 16:
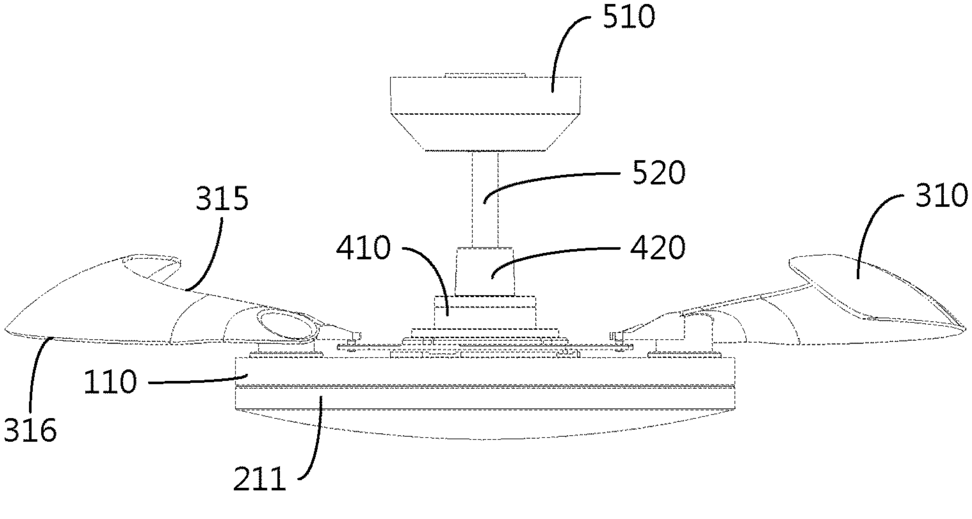

Furthermore, as shown in FIG. 9 and FIG. 10, the clamping member 230 includes a top wall 231, a bottom wall 232, a side wall 233, and a stopper 234, the top wall 231 and the bottom wall 232 are spaced apart from each other, the side wall 233 is connected to the top wall 231 and the bottom wall 232, the stopper 234 is provided between the top wall 231 and the bottom wall 232, and the top wall 231, the bottom wall 232, the side wall 233, and the stopper 234 enclose a clamping groove 235. Along the circumferential direction of the annular mounting portion 213, the stopper 234 is located on a side of clamping member 230 near the first guide inclination surface 2141, the side surface of the stopper 234 facing the clamping groove 235 is the second guide inclination surface 2341, a first gap 238 is located between the stopper 234 and the top wall 231, and a second gap 239 is located between the stopper 234 and the bottom wall 232. In this example, the stopper 234 may be suspended on the side wall 233, so that the stopper 234 can be properly deformed during the clamping process, so that the clamping member 230 is more smoothly clamped with the lamp shade 210.

In order to improve the light-emitting effect of the fan lamp, optionally, the light source assembly 220 includes a substrate 221 and an LED light source 222 provided on the substrate 221, and the LED light source 222 has the advantages of small volume, energy saving, environmental protection, long service life, high luminous efficiency and the like. The substrate 221 can adopt an integrated annular structure, but the size of this kind of substrate 221 is relatively large, which is not conducive to the transportation of the fan lamp. In order to solve this problem, the light source assembly 220 further includes conjunction members 223, at least two substrates 221 are provided, at least one light source 222 is mounted on each substrate 221. Any adjacent substrates are connected with each other through the conjunction members 223 to form an annular light source assembly 220. In this example, at least two substrates 221 are assembled together through the conjunction members 223, thereby forming the light source assembly 220 that is annular, and the size of a single substrate 221 is small, thereby facilitating the transportation of the fan lamp.

The conjunction members 223 may be located between the adjacent substrates 221, and in other examples, the conjunction members 223 and the LED light sources 222 are both located on the same side of the substrates 221. Relatively, in a case where the latter structure is used, the conjunction members 223 have more arrangement space, so that the structure of the conjunction members 223 can be optimized. For example, the connection area of the conjunction members 223 and the substrates 221 can be increased, and the connection strength between the conjunction members 223 and the adjacent substrates 221 is higher.

Optionally, each substrate 221 comprises a first surface that is provided with the LED light sources 222. In the connected substrates 221, an edge of the first surface of one of the connected substrates 221 is provided with a first joint portion **221*a*, an edge of the first surface of the other one is provided with a second joint portion 221*b*, and the first joint portion 221*a* is connected to the second joint portion 221*b* by the conjunction members 223. When the lamp assembly 200 is assembled, at first, the first joint portion 221*a* may be connected to the conjunction member 223, and then the conjunction member 223 is connected to the second joint portion 221*b*, thereby connecting the substrates 221 together. The first joint portion 221*a* and the second joint portion 221*b* are both provided at the edge of the substrates 221, so that the first joint portion 221*a* and the second joint portion 221*b* do not occupy too much space of the substrates 221, so as to dispose the LED light sources 222 on the substrates 221**.

Furthermore, in order to simplify the assembly operation of the lamp assembly 200, both the first joint portion **221*a* and the second joint portion 221*b* may be connected to the conjunction member 223** by the threaded connection members.

In an optional example, in a thickness direction of the lamp panel 100, a distance between an end of the lamp panel 100 away from the lamp shade 210 and an end of the lamp shade 210 away from the fan assembly 300 is a first distance L1, and a maximum distance between two opposite ends of the lamp panel circumferential outer wall 110 is a second distance L2 in a length direction of the lamp panel 100. A ratio of the first distance L1 to the second distance L2 is less than or equal to 0.165. In this way, the first distance L1 can be designed as small as possible, so that the overall height of the fan lamp is smaller, and the decoration of the fan lamp is improved.

In an example, the fan lamp further includes a top mounting assembly 500 and a driver 540, and the driver 540 is provided on the top mounting assembly 500, the fan assembly 300 or the lamp assembly 200, that is, the driver 540 can be mounted by using the structure of the top mounting assembly 500, the fan assembly 300, or the lamp assembly 200, so that the additional space occupied by the driver 540 is smaller, and even no additional space is occupied, so that the structure of the fan lamp is more compact. In an optional example, the driver 540 is electrically connected to at least one of the fan assembly 300 and the lamp assembly 200, thereby achieving the driving of at least one of the fan assembly 300 and the lamp assembly 200. In a case where the driver 540 is electrically connected to the lamp assembly 200, the lamp assembly 200 may be driven to emit light, thereby achieving the lighting function of the fan lamp. In a case where the driver 540 is electrically connected to the fan assembly 300, the fan assembly 300 can be driven to be unfolded and stored, and the unfolding fan assembly 300 can be driven to rotate, thereby achieving the blowing function of the fan lamp. In a case where the driver 540 is electrically connected to both the fan assembly 300 and the lamp assembly 200, the driver 540 can drive the fan assembly 300 to rotate and the lamp assembly 200 to emit light at the same time, so that the blowing function and the lighting function of the fan lamp are achieved at the same time.

Furthermore, the driver 540 may be configured to be electrically connected to the direct current motor 410 and the lamp assembly 200 simultaneously. At this time, the driver 540 may be integrated, and the same driver 540 may supply power to the direct current motor 410 and the lamp assembly 200 at the same time, and the number of the required drivers 540 is naturally decreased. Optionally, the driver 540 may be configured as one, in a case where the power consumption of the fan lamp is large, two or even more drivers 540 may also be provided, and each driver 540 is configured to be electrically connected to the direct current motor 410 and the lamp assembly 200 at the same time. According to the structure, the fan assembly 300 and the lamp assembly 200 can be driven by the same driver 540, and compared with the mode that the fan assembly 300 and the lamp assembly 200 are driven through different drivers, respectively, the number of articles of the fan lamp disclosed by the example of the present disclosure is reduced, so that the space occupied by the fan lamp is smaller, and further transportation of the fan lamp is facilitated.

In an optional example, the top mounting assembly 500 may include a second decorative cover 510, the second decorative cover 510 has a mounting cavity, and the driver 540 is mounted in the mounting cavity. At this time, the driver 540 is mounted by using the mounting cavity in the second decorative cover 510, and the driver 540 basically does not occupy extra space, so that the structure of the fan lamp is more compact.

In another example, the lamp assembly 200 has an optical cavity, and the driver 540 is mounted in the optical cavity. The optical cavity is large in space, so that the driver 540 is more convenient to be arranged. Meanwhile, if the driver 540 needs to be disassembled, the driver 540 can be directly seen only by opening the lamp assembly 200 (specifically, the lamp shade 210 can be detached), so that the structure is more convenient for the maintenance of the driver 540.

As described above, the fan assembly 300 may include a plurality of fan blades 310, as shown in FIG. 14 to FIG. 22, in an optional example, the number of the fan blades 310 may be two, and relatively, the weight of the two fan blades 310 is relatively light, so that the weight of the entire fan lamp can be properly reduced, and further, the number of members of the fan lamp can be reduced, and the fan lamp can be assembled conveniently.

Each of the fan blades 310 may have an inner edge line 315 and an outer edge line 316, the inner edge line 315 is an edge line of a side of each of the fan blades 310 near the direct current motor 410, and the outer edge line 316 is an edge line of a side of each of the fan blades 310 away from the direct current motor 410. Optionally, in order to improve the blowing effect of the fan assembly 300, along the extending direction of the each of fan blades 310, the vertical distance between the inner edge line 315 and the lamp panel 100 gradually increases and then gradually decreases. The vertical distance here refers to a size in a direction of perpendicular to the lamp panel 100. According to the structure, the area of the fan blades 310 can be gradually increased and then gradually reduced, so that a larger disturbance effect is generated on the airflow, and the purpose of improving the blowing effect is achieved; and meanwhile, the size of each of the fan blades 310 can be properly reduced by gradually reducing the area of the fan blades 310, so that the weight of the fan blades 310 is reduced.

In a further optional example, the inner edge line 315 may be higher than the outer edge line 316, so that the area of the windward side of each of the fan blades 310 is larger, thereby achieving the purpose of improving the blowing effect.

Figure 17:
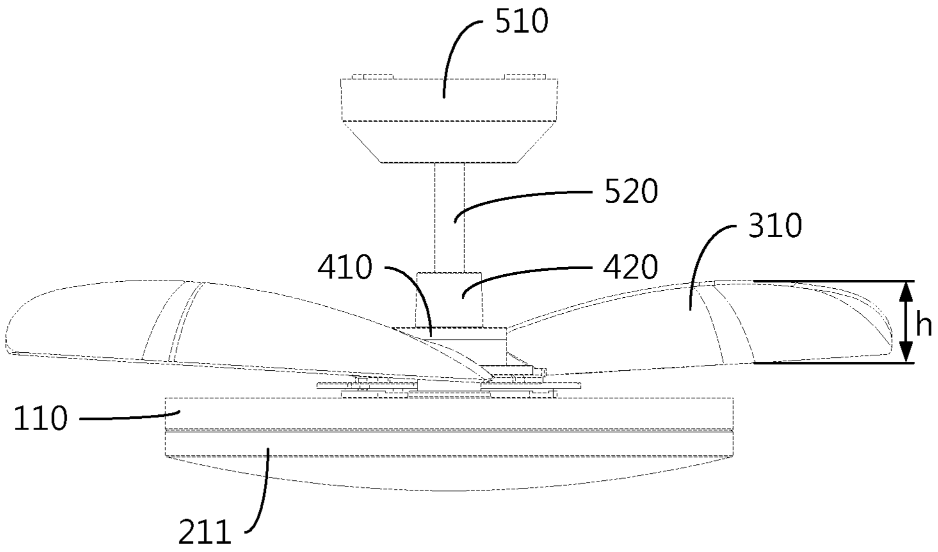
Figure 18:
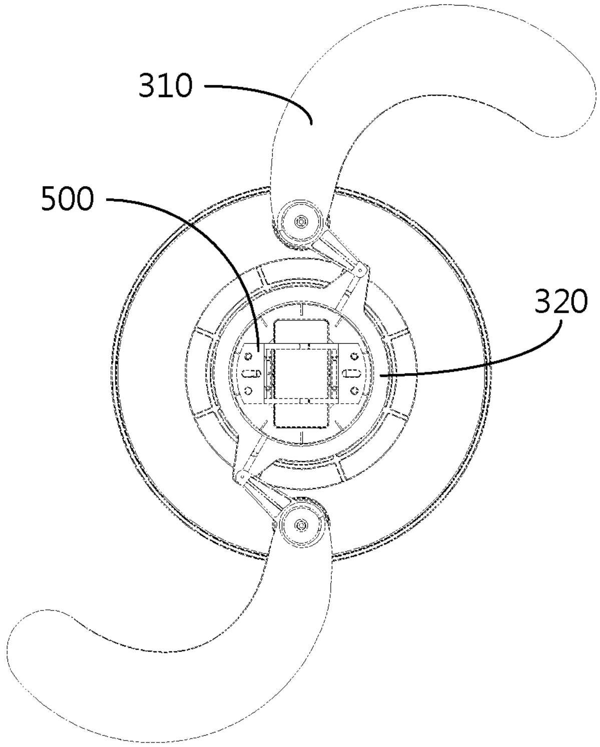
Figure 19:
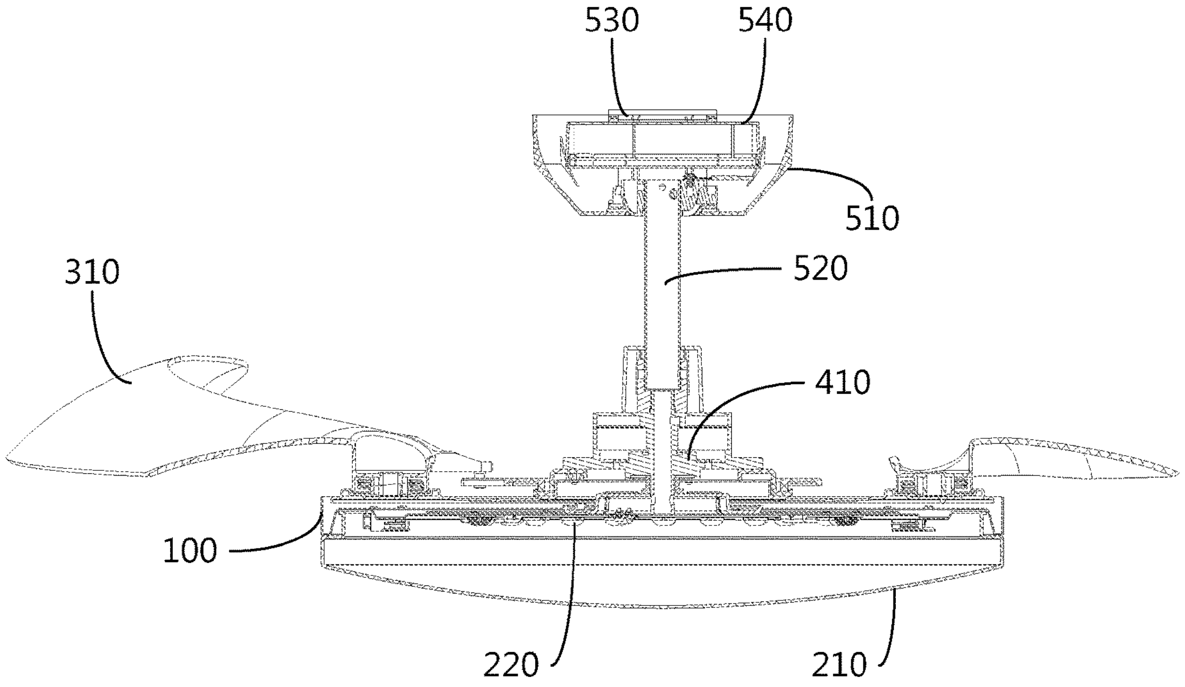
FIG. 19 is a cross-sectional view of the fan lamp shown in FIG. 14.
Figure 20:
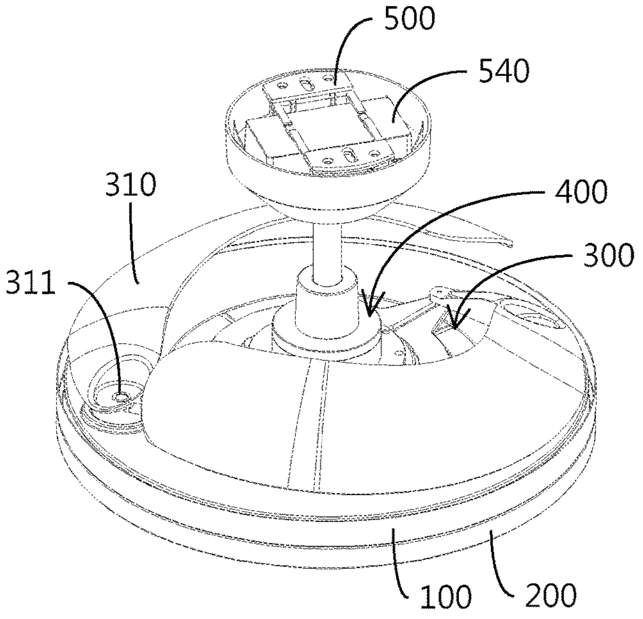
FIG. 20 and FIG. 21 are schematic diagrams of the fan lamp shown in FIG. 14 in another state.
Figure 21:
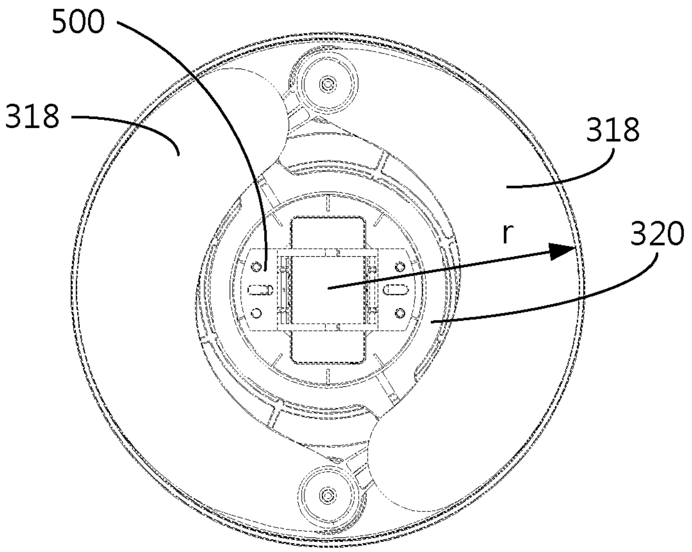
Figure 22:
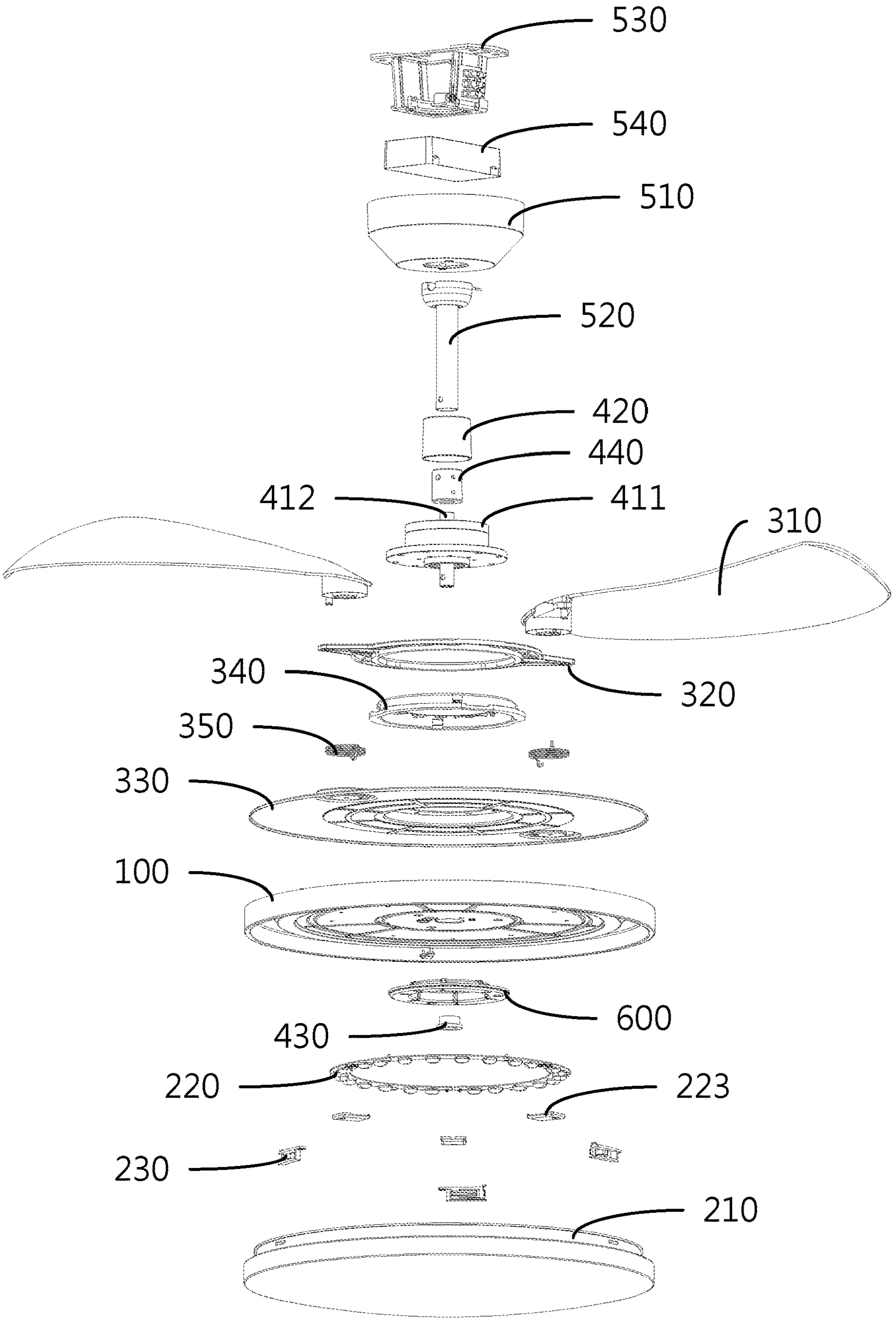
FIG. 22 is an exploded view of the fan lamp shown in FIG. 14.

It can be understood that the inner edge line 315 has the highest point, as shown in FIG. 17 and FIG. 21, the vertical distance h=(0.15-0.3)*r between the highest point and the outer edge line 316, where r is a distance between the outer edge line 316 and the center of rotation of the fan assembly 300 when the fan blades 310 are in the storage position, and the distance may be the maximum distance. That is, in a case where the fan blades 310 are located at the storage positions, and the distances between the outer edge line 316 and the rotation center of the fan assembly 300 are different, the position of the highest point of the inner edge line 315 may also be different, thereby flexibly adjusting the area of the windward side of the fan blades 310 according to the size of the fan blades 310, thereby optimizing the blowing effect of the fan lamp.

Figure 23:
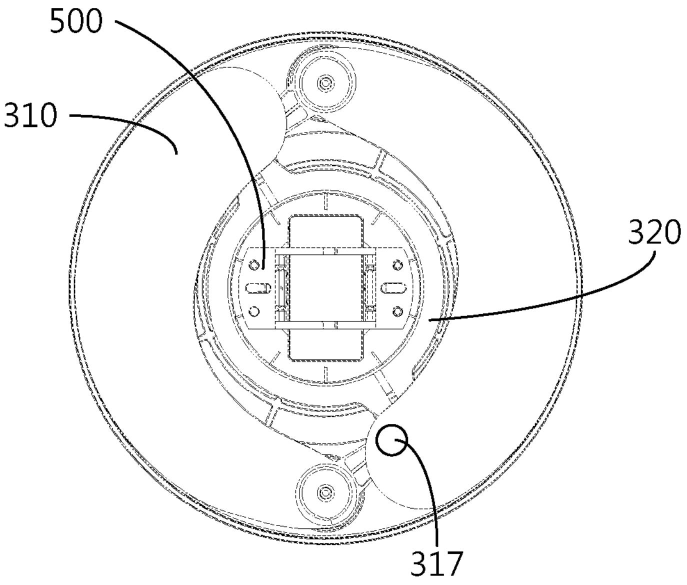
FIG. 23 is a schematic diagram of a partial structure of a fan lamp disclosed by another example of this disclosure.
Figure 24:
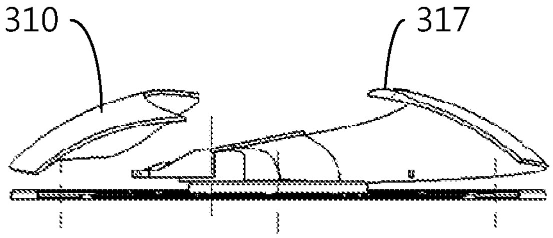
FIG. 24 is a cross-sectional view of the structure shown in FIG. 23.

As mentioned above, each of the fan blades 310 has a free end, and optionally, as shown in FIG. 23 and FIG. 24, a counterweight structure is provided on the free end. After the free end is provided with the counterweight structure 317, the weight of the free end of each of the fan blades 310 increases. In the rotation process of the fan blades 310, the stability of the entire fan blades 310 is higher. The arrangement position of the counterweight structure 317 may be one side where the outer edge line 316 is located, but under the condition that the side where the inner edge line 315 is located is more likely to vibrate, the counterweight structure 317 can be provided on one side where the inner edge line 315 is located, so that the fan blade 310 rotates more stably.

The counterweight structure 317 may be a counterweight block separately mounted on the fan blade 310, or may be a structure integrally provided with the fan blade 310. In order to facilitate assembly of the fan lamp and to prolong the service life of the counterweight structure 317, the counterweight structure 317 and the fan blade 310 can be integrally arranged. At this time, the position of the counterweight structure 317 may be the maximum thickness of the fan blades 310. That is, the local thickness of the free end of each of the fan blades 310 may be increased, thereby forming the counterweight structure 317.

As mentioned above, each of the fan blades 310 can rotate around the central axis M of the first rotating connecting portions 313, and in a case where the number of the fan blades 310 is two, the central axis M of the first rotating connecting portion 313 of one of the fan blades 310 is the first axis, the central axis M of the first rotating connecting portion 313 of the other one of fan blades 310 is a second axis, and the first axis, the second axis, and the rotating axis of the turntable 330 are coplanar. That is, the rotation centers of the two fan blades 310 are symmetrically distributed on two sides of the rotation center of the turntable 330, so that the structure of the entire fan lamp is more stable, and the operation is more stable.

The portion formed by extending the fan blade 310 from the mounting portion 311 to the free end may be defined as the fan body 318, and in order to further control the height of the fan lamp, in the storage position, the fan body 318 of one of the fan blades 310 and the fan body 318 of the other one of fan blades 310 do not overlap each other, thereby avoiding the situation that the height of the fan lamp is increased due to large-area overlapping of the two fan blades 310, so that the fan lamp is lighter and simpler.

The present disclosure disclose a fan lamp, it can solve at least one problem of poor use experience.

The present disclosure employs the following technical solution.

A fan lamp, comprising: a lamp panel, a lamp assembly, a fan assembly, and a motor assembly. The lamp assembly is provided on a side of the lamp panel; the fan assembly is provided on a side of the lamp panel away from the lamp assembly; and the motor assembly comprises a direct current motor, and the fan assembly is configured to rotate under the driving of the direct current motor.

The technical solution adopted in the present disclosure can achieve the following beneficial effects:

In the fan lamp disclosed in the present disclosure, the DC motor is used to drive the fan assembly to rotate, without the use of additional parts, such as capacitors and motor covers, the structure of the motor assembly is simplified, the volume of the motor assembly is reduced, so that the overall volume of the fan lamp is reduced, which makes the structure of the fan light more neat and beautiful, and the use experience of the user is improved.

The fan lamp disclosed uses the direct current motor to drive the fan assembly to rotate, without using additional members, such as a capacitor or a motor shade, the structure of the motor assembly is simplified, and the volume of the motor assembly is reduced, so that an overall volume of the fan lamp is decreased, which make the structure of the fan lamp cleaner and more attractive, and the use experience of the user is improved.

The above examples of the present disclosure focus on the differences between the various examples, and different optimization features between the various examples may be combined to form another example as long as different optimization features are not contradictory, which is not repeated here in consideration of brevity.

The above descriptions are merely examples of the present disclosure, and are not intended to limit the present disclosure. Various modifications and variations of this disclosure are possible for those skilled in the art. Any modification, equivalent replacement, improvement, etc. made within the spirit and principle of the present disclosure shall be included within the scope of the present disclosure.

What is claimed is:

1. A fan lamp, comprising: a lamp panel, a lamp assembly, a fan assembly, and a motor assembly; and wherein the lamp assembly is provided on a side of the lamp panel, the lamp assembly comprises a lamp shade, the lamp shade is fixedly mounted on the lamp panel, a contour of a lamp shade circumferential outer wall of the lamp shade is the same as a contour of a lamp panel circumferential outer wall of the lamp panel;

the fan assembly is provided on a side of the lamp panel away from the lamp assembly; and the motor assembly comprises a direct current motor, and the fan assembly is configured to rotate under the driving of the direct current motor;

wherein the lamp assembly further comprises a light source assembly, the light source assembly is in an accommodation cavity surrounded by the lamp panel and the lamp shade, and an end of the lamp shade circumferential outer wall near the fan assembly abuts against an end of the lamp panel circumferential outer wall away from the fan assembly.

2. The fan lamp according to claim 1, wherein:

the fan assembly comprises a turntable, a plurality of fan blades, and a synchronizer;

each of the plurality of fan blades comprises a mounting end and a free end, and the mounting end has a mounting portion and a connecting portion spaced apart from each other;

the mounting portion is mounted on the turntable through a first rotating connecting portion, and each of the plurality of fan blades is capable of rotating around a central axis (M) of the first rotating connecting portion; and the connecting portion is mounted on the synchronizer through a second rotating connecting portion, so that the plurality of fan blades are capable of synchronously switching between storage positions and unfolding positions.

3. The fan lamp according to claim 2, wherein the direct current motor comprises a motor main body and a motor shaft, the motor shaft is fixedly mounted on the turntable, and the motor shaft is fixed relative to the lamp panel.

4. The fan lamp according to claim 3, wherein:

the fan lamp comprises a top mounting assembly, the motor assembly is provided on a side of the turntable away from the lamp panel, the top mounting assembly is provided on a side of the motor assembly away from the turntable; and the top mounting assembly comprises a hanging cup and a derrick, an end of the derrick is connected to the hanging cup, and other end of the derrick is fixed on the motor shaft.

5. The fan lamp according to claim 3, wherein the fan lamp comprises a top mounting assembly, the top mounting assembly comprises a derrick, the motor assembly comprises a connecting member and a first decorative cover, the connecting member is connected to the derrick and the motor shaft, and the first decorative cover covers an outer side of the connecting member.

6. The fan lamp according to claim 3, wherein:

the fan assembly further comprises a fixing ring, the fixing ring is fixedly mounted on the turntable, the motor main body is fixedly mounted on the fixing ring, the synchronizer is annular, the synchronizer is sleeved on an outer side of the fixing ring; and a limiting structure is provided between the synchronizer and the fixing ring, the limiting structure comprises an unfolding limiting portion and a storage limiting portion, the unfolding limiting portion is capable of limiting the plurality of fan blades to the unfolding positions, and the storage limiting portion is capable of limiting the plurality of fan blades to the storage positions.

7. The fan lamp according to claim 3, wherein the fan lamp comprises a fixing plate, the fixing plate is fixedly mounted on the motor shaft, and the lamp panel is fixedly mounted on the fixing plate.

8. The fan lamp according to claim 7, wherein the fan lamp further comprises a shaft sleeve sleeved on the motor shaft, and the shaft sleeve is located between the motor main body and the fixing plate.

9. The fan lamp according to claim 1, wherein the direct current motor is configured to be at least partially exposed relative to the fan assembly.

10. The fan lamp according to claim 1, wherein the lamp panel comprises a bottom plate and a circumferential plate, the lamp shade comprises a lamp shade body and an annular mounting portion, the lamp shade circumferential outer wall is located at the periphery of the lamp shade body, the lamp panel circumferential outer wall is located at the periphery of the circumferential plate, the annular mounting portion is sleeved in the inner side of the circumferential plate, and the annular mounting portion is clamp with the lamp panel.

11. The fan lamp according to claim 10, wherein the lamp assembly comprises a clamping member, the bottom plate is clamped with the annular mounting portion through the clamping member, and the clamping member is integrally formed.

12. The fan lamp according to claim 11, wherein:

the clamping member comprises a first mounting portion and a second mounting portion, the first mounting portion has a threaded mounting portion and a clamping portion, the bottom plate is provided with a mating section cooperating with the clamping portion, the threaded mounting portion is fastened on the bottom plate through a threaded mounting member, and the clamping portion is clamped with the mating section; and one of the second mounting portion and the annular mounting portion is provided with a clamping groove, another of the second mounting portion and the annular mounting portion is provided with a clamping protrusion, and the clamping protrusion is capable of clamping in the clamping groove.

13. The fan lamp according to claim 12, wherein a plurality of clamping protrusions are arranged on the annular mounting portion at intervals along the circumferential direction of the annular mounting portion, and the lamp assembly comprises a plurality of clamping members corresponding to the plurality of clamping protrusions.

14. The fan lamp according to claim 13, wherein:

at least one of the plurality of clamping protrusions and the plurality of clamping members are made of an elastically deformable material; and at least one of the plurality of clamping protrusions and the plurality of clamping members have a guiding structure.

15. The fan lamp according to claim 14, wherein:

the guiding structure comprises a first guiding inclination surface provided on each of the plurality of clamping protrusions and a second guiding inclination surface provided on each of the plurality of clamping members; and along the circumferential direction of the annular mounting portion, the first guiding inclination surface is located on an end surface of the each of the plurality of clamping protrusions, and the second guiding inclination surface is located on a side of the each of the plurality of clamping members near the first guiding inclination surface.

16. The fan lamp according to claim 1, wherein the light source assembly comprises a substrate and a LED light source provided on the substrate.

17. The fan lamp according to claim 16, wherein:

the light source assembly further comprises conjunction members, two substrates are provided, each of the two substrates is provided with at least one of LED light sources; and any adjacent substrates are connected by the conjunction members, and an annular light source assembly is formed.

18. The fan lamp according to claim 17, wherein the conjunction members and the LED light sources are located on a same side of the substrates.

19. The fan lamp according to claim 17, wherein:

each of the substrates comprises a first surface that is provided with the LED light sources; and in connected substrates, an edge of the first surface of one of the connected substrates is provided with a first joint portion, an edge of the first surface of the other one of the connected substrates is provided with a second joint portion, and the first joint portion is connected to the second joint portion by the conjunction members.

20. The fan lamp according to claim 1, wherein, in a thickness direction of the lamp panel, a distance between an end of the lamp panel away from the lamp shade and an end of the lamp shade away from the fan assembly is a first distance, and a maximum distance between two opposite ends of the lamp panel circumferential outer wall is a second distance in a length direction of the lamp panel, and a ratio of the first distance to the second distance is less than or equal to 0.165.

21. The fan lamp according to claim 1, wherein the fan lamp further comprises a top mounting assembly and a driver, the driver is provided on the top mounting assembly, the fan assembly or the lamp assembly, and the driver is configured to electrically connect to the direct current motor and the lamp assembly at the same time.

22. The fan lamp according to claim 21, wherein the top mounting assembly comprises a second decorative cover, the second decorative cover has a mounting cavity, and the driver is mounted in the mounting cavity.

23. The fan lamp according to claim 21, wherein the lamp assembly has an optical cavity, and the driver is mounted in the optical cavity.

* * * * *